Feb. 17, 1953 — H. L. KINDORF ET AL — 2,628,800
HANGER FOR ATTACHMENT TO STRUCTURAL SHAPES
Filed Aug. 1, 1949
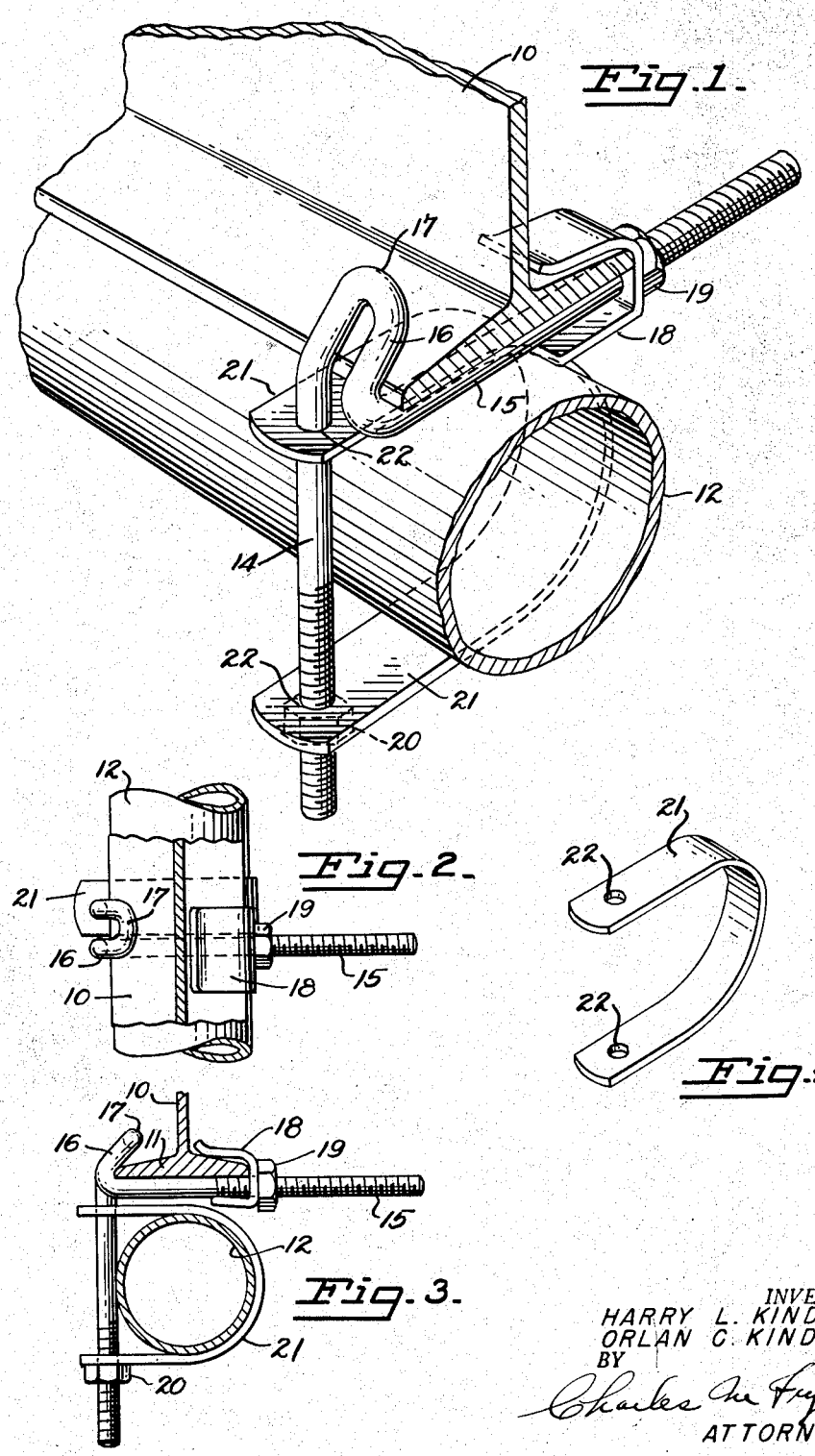
INVENTORS
HARRY L. KINDORF
ORLAN C. KINDORF
BY Charles M. Fryer
ATTORNEY Patented Feb. 17, 1953

2,628,800

UNITED STATES PATENT OFFICE 2,628,800

HANGER FOR ATTACHMENT TO STRUCTURAL SHAPES

Harry L. Kindorf and Orlan C. Kindorf, San Francisco, Calif., assignors to The Kindorf Co., San Francisco, Calif., a corporation of California Application August 1, 1949, Serial No. 107,994

1 Claim. (Cl. 248—72)

This invention relates to hangers of the kind implied for supporting pipes or conduits from the structural members of buildings or the like.

It is an object of the invention to provide a hanger of simple and inexpensive manufacture capable of sustaining heavy loads and capable of adjustment throughout a wide range with respect to the size of the structural member to which it is attached.

In order to illustrate the principles of the invention, it is shown and described herein as associated with the flange of an I beam and as supporting a conduit. Its application to other structural shapes will, however, be clearly understood from the following disclosure and the term "beam flange" as employed in the specification and claims is intended as inclusive of any and all flat portions of structural forms having opposed edges for engagement of the hook-like supporting parts to be described. Likewise, the term "conduit" shall be understood as including any article or device to be supported as it is common practice to support pipes and electric conductors of many forms in the same manner. Furthermore, as will also appear in the following description, the present invention is adapted to support apparatus such as heaters, blowers and other equipment commonly used in shops and industrial plants.

The following detailed specification will refer to the accompanying drawings and will make apparent further and more specific objects and advantages of the invention.

In the drawings:

Fig. 1 is a perspective view of a hanger embodying the present invention and shown assembled on the bottom flange of an I beam and supporting a conduit.

Fig. 2 is a plan view on a smaller scale of the assembly shown in Fig. 1.

Fig. 3 is a front elevation of the same assembly, and

Fig. 4 is a perspective view of a conduit supporting strap used in the combination illustrated in the other figures.

Figs. 1, 2 and 3 of the drawings illustrate a fragment of an I beam at 10 having the usual flat beam flange 11 to which the hanger is secured and a section of conduit 12 is shown as supported by the hanger. The hanger itself comprises a piece of rod 14 threaded at its opposite ends to receive nuts and having an especially designed bent portion intermediate its ends to provide a hook for engagement with an edge of a beam flange and a support for an extending hanger part. The shape of this bent portion is best illustrated in Fig. 1 of the drawing wherein one straight end 15 of the rod is shown as underlying the beam flange while a short portion 16 is bent up and back to provide a hook to engage the edge of the flange. A reverse bend 17 connects the hook with the extending and supporting part 14 which, as illustrated, will extend downwardly from a horizontally disposed beam flange.

A somewhat U-shaped clip 18 is perforated to slide over the part 15 of the rod and to serve as a hook in embracing the edge of the flange opposite to the edge embraced by the part 16. A nut 19 on the threaded end of the rod portion 15 is tightened to draw the clip 18 into tight engagement with the edge of the flange and the hanger is, therefore, adaptable to beam flanges of a wide range of widths by varying the position of the clip 18 and nut 19.

The extending part 14 of the hanger also has a nut 20 on its threaded end which will serve to support any desired apparatus or equipment. In the present illustration, a U-shaped strap 21 (see also Fig. 4) having aligned perforations 22 adjacent its ends is supported on the extension 14 by the nut 20 and embraces the conduit 12. The size and shape of the strap 21 may, of course, be varied in accordance with the conduit or other part to be supported.

As the principal parts of the hanger are made by simple bending operations of inexpensive stock, its cost is relatively low though its adaptability as to size and various supporting arrangements is unusually great.

We claim:

A hanger for attachment to opposite edge portions of a flat part of a structural member, said hanger comprising a single continuous rod member bent intermediate its ends to provide a straight section to lie against the bottom face of said flat part of the structural member, an intermediate substantially U-shaped reversely bent part extending laterally from the inner end of said straight section at an inclination thereto and providing two laterally spaced oppositely disposed hook portions to engage over one edge portion of the structural member, and a second straight section extending at substantially a right angle to said first mentioned straight section from one leg of said U-shaped intermediate part and offset to one side of said first mentioned straight section, the first mentioned straight section having a threaded outer portion, an apertured hook-like member slidable on said first mentioned straight section to engage over one edge portion of said structural member, a nut threaded on said first mentioned straight section for retaining said hook-like member in place, and a substantially U-shaped supporting strap having the opposite outer end portions of the sides thereof each provided with an aperture to slidably fit on said second mentioned straight section, the second mentioned straight section having a threaded outer end portion, and a nut engaging said last mentioned threaded portion to hold said strap member in position on said second straight section of the hanger.

HARRY L. KINDORF.
ORLAN C. KINDORF.

REFERENCES CITED

The following references are of record in the file of this patent:

UNITED STATES PATENTS

| Number | Name | Date |
| --- | --- | --- |
| 524,603 | McIlvrid | Aug. 14, 1894 |
| 691,531 | Clark | Jan. 21, 1902 |
| 1,466,925 | Biggs et al. | Sept. 4, 1923 |
| 1,652,695 | Barber | Dec. 13, 1927 |

FOREIGN PATENTS

| Number | Country | Date |
| --- | --- | --- |
| 18,017 | Great Britain | of 1902 |